US011132556B2

(12) United States Patent
Amrani et al.

(10) Patent No.: US 11,132,556 B2
(45) Date of Patent: Sep. 28, 2021

(54) DETECTING APPLICATION SWITCHES IN VIDEO FRAMES USING MIN AND MAX POOLING

(71) Applicant: International Business Machines Corporation, Armonk, NY (US)

(72) Inventors: Elad Amrani, Zikhron Yaakov (IL); Dror Porat, Haifa (IL); Daniel Nechemia Rotman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/686,151

(22) Filed: Nov. 17, 2019

(65) Prior Publication Data

US 2021/0150221 A1    May 20, 2021

(51) Int. Cl.
*G06K 9/00* (2006.01)
*G06K 9/46* (2006.01)
*G06K 9/62* (2006.01)

(52) U.S. Cl.
CPC ..... *G06K 9/00744* (2013.01); *G06K 9/00718* (2013.01); *G06K 9/00765* (2013.01); *G06K 9/4642* (2013.01); *G06K 9/6212* (2013.01)

(58) Field of Classification Search
None
See application file for complete search history.

(56) References Cited

U.S. PATENT DOCUMENTS

| | | | | |
|---|---|---|---|---|
| 6,055,323 A * | 4/2000 | Okumura | ........... | G06K 9/00268 382/118 |
| 6,741,727 B1 * | 5/2004 | Hirasawa | ................. | G07D 7/12 356/71 |
| 7,522,745 B2 * | 4/2009 | Grasso | ...................... | G06T 5/00 351/210 |
| 10,806,393 B2 * | 10/2020 | Einfalt | ................. | G06K 9/6218 |
| 2005/0074140 A1 * | 4/2005 | Grasso | ............... | G08B 13/1968 382/103 |
| 2007/0003121 A1 * | 1/2007 | Aach | ..................... | G06T 7/0012 382/130 |
| 2015/0030252 A1 | 1/2015 | Corso et al. | | |
| 2020/0237290 A1 * | 7/2020 | Einfalt | ............... | G06K 9/00281 |

OTHER PUBLICATIONS

Li et al., "Object bank: A high-level image representation for scene classification and semantic feature sparsification." In NIPS, 2010. (Year: 2010).*

(Continued)

*Primary Examiner* — Feng Niu
(74) *Attorney, Agent, or Firm* — Barry. D. Blount (57) ABSTRACT

An example system includes a processor to receive a number of video frames. The processor is to apply a grid to each video frame of the number of video frames and generate features for each cell in the grid. The processor is to calculate distances between matching regions of two consecutive frames. The processor is to apply max pooling followed by min pooling in horizontal regions of the number of video frames. The processor is to apply max pooling followed by min pooling in vertical regions of the number of video frames. The processor is to detect an application switch in response to detecting both a horizontal change and a vertical change between the two consecutive video frames exceed a threshold.

20 Claims, 6 Drawing Sheets

(56) References Cited

OTHER PUBLICATIONS

Mirza et al., "Switch detector: an activity spotting system for desktop." In Proceedings of the 20th ACM international conference on Information and knowledge management, pp. 2285-2288. 2011. (Year: 2011).*

Gan, Chuang et al., "DevNet: A Deep Event Network for Multimedia Event Detection and Evidence Recounting," IEEE Conference on Computer Vision and Pattern Recognition (CVPR), 2015, pp. 2568-2577.

Al-Shakarji, Noor M. et al. "CS-LoFT: Color and Scale Adaptive Tracking Using Max-Pooling with Bhattacharyya Distance," 2016 IEEE Applied Imagery Pattern Recognition Workshop (AIPR), Washington, DC, USA, Oct. 18, 2016, pp. 1.

Fernando, Basura et al., "Rank Pooling for Action Recognition," IEEE Transactions on Pattern Analysis and Machine Intelligence, vol. 39, Issue 4, May 17, 2016, pp. 1-21.

\* cited by examiner

DETECTING APPLICATION SWITCHES IN VIDEO FRAMES USING MIN AND MAX POOLING

BACKGROUND

The present techniques relate to detecting application switches. More specifically, the techniques relate to detecting application switches in video frames.

SUMMARY

According to an embodiment described herein, a system can include processor to receive a plurality of video frames. The processor can also further apply a grid to each video frame of the plurality of video frames and generate features for each cell in the grid. The processor can also calculate distances between matching regions of two consecutive frames. The processor can also further apply max pooling followed by min pooling in horizontal regions of the plurality of video frames. The processor can apply max pooling followed by min pooling in vertical regions of the plurality of video frames. The processor can also further detect an application switch in response to detecting both a horizontal change and a vertical change between the two consecutive video frames exceed a threshold.

According to another embodiment described herein, a computer-implemented method can include receiving, via a processor, a plurality of video frames. The method can further include applying, via the processor, a grid to each video frame of the plurality of video frames and generating features for each cell in the grid. The method can also further include calculating, via the processor, distances between matching regions of two consecutive frames. The method can also include applying, via the processor, max pooling followed by min pooling in horizontal regions of the plurality of video frames. The method can also further include applying, via the processor, max pooling followed by min pooling in vertical regions of the plurality of video frames. The method can further include detecting, via the processor, an application switch in response to detecting both a horizontal change and a vertical change between the two consecutive video frames exceed a threshold.

According to another embodiment described herein, a computer program product for detecting application switches can include computer-readable storage medium having program code embodied therewith. The computer readable storage medium is not a transitory signal per se. The program code executable by a processor to cause the processor to receive a plurality of video frames. The program code can also cause the processor to apply a grid to each video frame of the plurality of video frames and generate features for each cell in the grid. The program code can also cause the processor to calculate distances between matching regions of two consecutive frames. The program code can also cause the processor to apply max pooling followed by min pooling in horizontal regions of the plurality of video frames. The program code can also cause the processor to apply max pooling followed by min pooling in vertical regions of the plurality of video frames. The program code can also cause the processor to also further detect an application switch in response to detecting both a horizontal change and a vertical change between the two consecutive video frames exceed a threshold.

DETAILED DESCRIPTION

Detection of a switch between applications being used by a user may be useful in various applications. However, detecting active computer application switches in an unsupervised manner may be very difficult without operating system (OS) access. For example, such OS access may not be available in a variety of settings, such as in video frames received during teleconferencing and other web applications. Moreover, although fully supervised training to detect such switches between applications may be feasible, such supervised training may require a diverse training dataset to cover all common applications. In addition, supervised training may require constant updates to training data since appearance of applications change over time. Therefore, training a switch detector in a supervised manner may work initially, but fail to detect switch between two unknown application that changed appearance from last time model was trained.

According to embodiments of the present disclosure, a processor can receive a number of video frames. The processor can apply a grid to each video frame of the number of video frames and generate features for each cell in the grid. The processor can also calculate distances between matching regions of two consecutive frames. The processor can further apply max pooling followed by min pooling in horizontal regions of the number of video frames. The processor can also further apply max pooling followed by min pooling in vertical regions of the number of video frames. The processor can then detect an application switch in response to detecting both a horizontal change and a vertical change between two consecutive video frames exceed a threshold.

Thus, embodiments of the present disclosure allow for better analysis of the meeting videos and faster searches in meeting videos. For example, the techniques may be used to detect transitions from a word processor to a presentation application and include such detected transitions as metadata in the videos. In addition, the techniques can be unsupervised. For example, the techniques may be used without any supervision in the form of training samples or access to OS internals. Moreover, the techniques may be used to detect the transitions in real-time. In addition, the techniques may be used to detect each point in time in which a switch is made between applications without any training data that shows what the applications look like.

Figure 1:
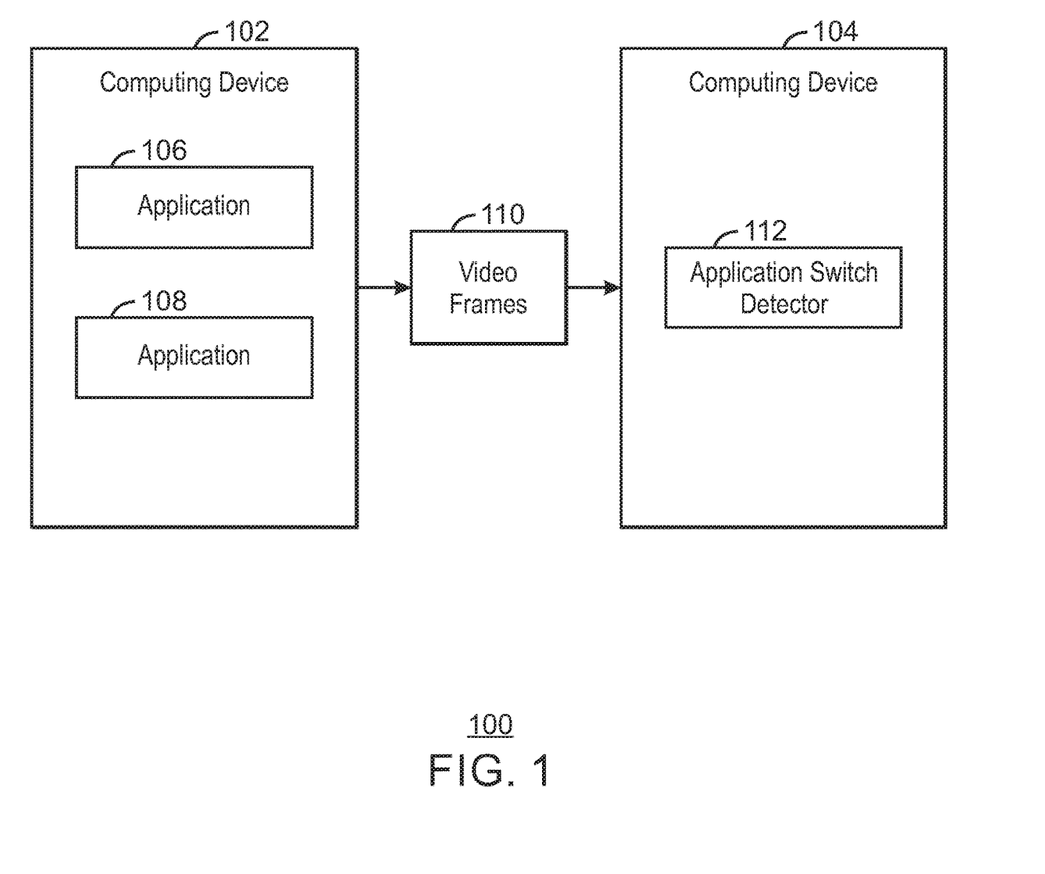
FIG. 1 is a block diagram of an example system for detecting switches between applications using min and max pooling.

With reference now to FIG. 1, a block diagram shows an example system for detecting switches between applications using min and max pooling. The example system is generally referred to by the reference number 100. FIG. 1 includes a computing device 102 communicatively coupled to a computing device 104. For example, the computing device 104 may be the computing device 300 of FIG. 3. The computing device 102 includes an application 106 and an application 108. For example, the applications 106 and 108 may be two different active computer applications. As one example, the application 106 may be a word processor and the application 108 may be a presentation application. The computing device 102 is shown sending video frames 110 to the computing device 104. For example, the video frames 110 may be sent via a teleconferencing application (not shown). The computing device 104 includes an application switch detector 112.

In the example of FIG. 1, the computing device 102 may be transmitting video frames 110 to the computing device 104. For example, the computing device 102 may be hosting a teleconference meeting with the computing device 104 using any suitable teleconferencing application.

Still referring to FIG. 1, the application switch detector 112 can detect a switch between applications 106 and 108 based on the video frames 110. The application switch detector 112 can inspect two consecutive frames at a time and identify regions in the frames that are constant indicating that either application 106 or application 108 is still being used. In various examples, the application switch detector 112 may detect a switch from the application 106 to the application 108 in response to detecting that a change in horizontal and vertical features calculated for the video frames 110 exceeds a threshold.

Thus, the application switch detector 112 searches for a relatively large region, either vertically or horizontally, in which the maximum change of color or gradients between consecutive frames in a relatively smaller region inside the relatively large region is small. If at least one such larger region exists, then it may be very likely that the two frames belong to either the application 106 of the application 108. If such relatively larger region does not exist, then it may be very likely that a switch was made from application 106 to application 108, or from application 108 to application 106. For example, the application switch detector 112 may detect the switch using the method 200 of FIG. 2.

As one example, the application 106 may be a web browser. Although changing a web page in the web browser may drastically change most pixels in a video frame, the top bar of the browser may remain mostly similar. In another example, application 108 may be a communication application that has a menu on the left that remains mostly similar Thus, to cover both of these instances, the application switch detector 112 may detect an application switch only when both a horizontal change and a vertical change is detected in two consecutive video frames. For example, an application 106 that is a web browser may experience vertical changes across a video frame with changing web pages. However, the web browser may not experience any horizontal changes across the top menu portion of the web browser. Thus, two consecutive frames of the application with different web pages may not be detected as an application change. If, however, the top menu of the web browser is changed to the left menu of the application 108 in the example of a communication application, then both horizontal and vertical changes may be detected. In this case, the application switch detector 112 may detect an application switch between the two frames. In some examples, the application switch detector 112 can insert metadata indicating the application switch into a video file containing the video frames 110.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, or additional applications, video frames, application switch detectors, etc.).

Figure 2:
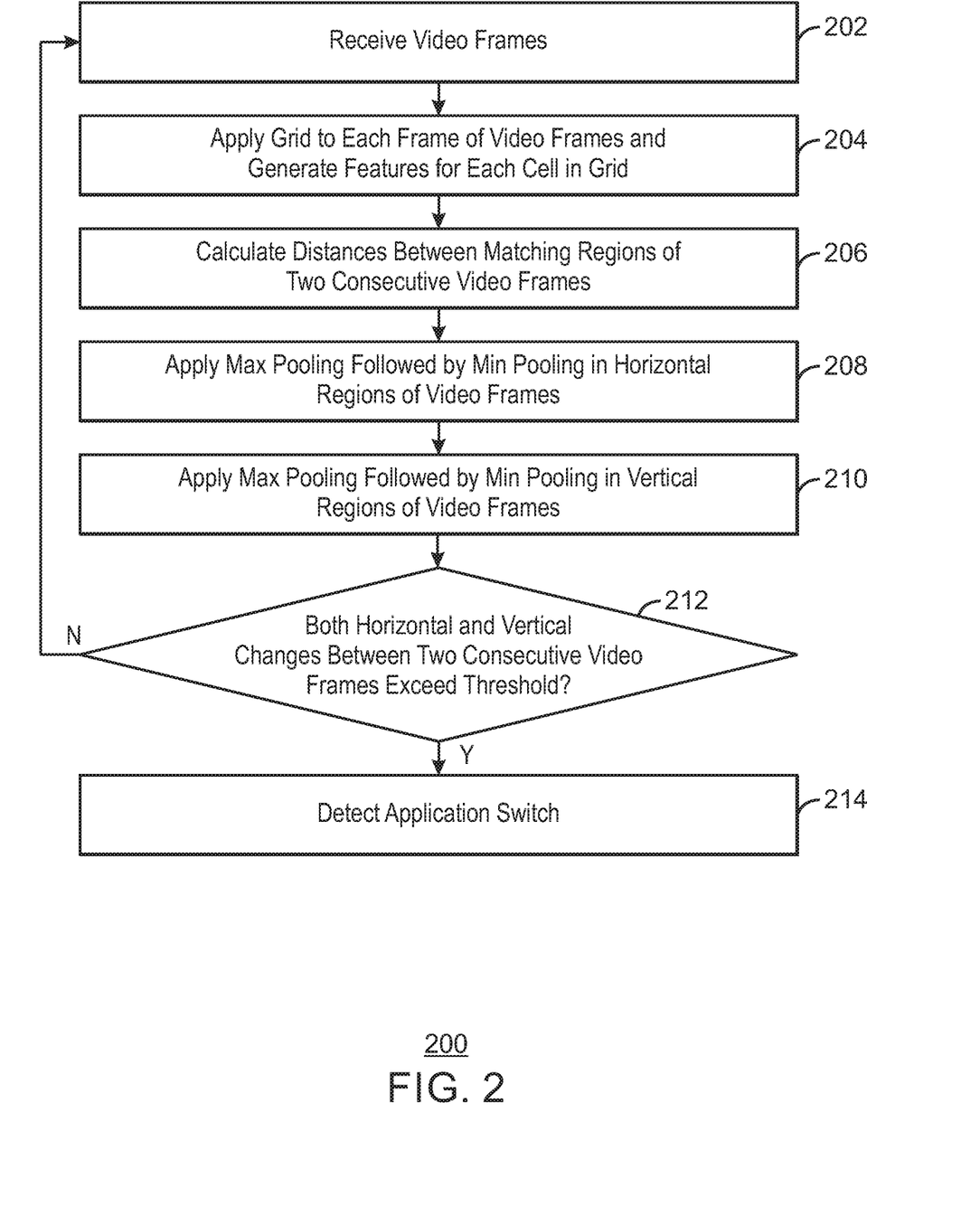
FIG. 2 is a block diagram of an example method that can detect switches between applications using min and max pooling.

FIG. 2 is a process flow diagram of an example method that can detect switches between applications using min and max pooling. The method 200 can be implemented with any suitable computing device, such as the computing device 300 of FIG. 3 and is described with reference to the systems 100 and 200 of FIGS. 1 and 2. For example, the methods described below can be implemented by the processors 302 or 602 of FIGS. 3 and 6.

At block 202, a processor or computing device receives a number of video frames. For example, the video frames may be received in real-time from a screen share of a teleconferencing application. In some examples, the video frames may be received from a video of a teleconference meeting.

At block 204, the processor or computing device applies a grid to each video frame of the number of video frames and generate features for each cell in the grid. For example, the processor may process two consecutive frames at a time. In various examples, the processor can compute a color histogram, a histogram of gradients, or both for each of the video frames. In various examples, other types of features may also be used. In some examples, the processor can apply a grid of N×X over each video frame and compute F features for $N^2$ cells. As one example, given N=20, the processor can apply a grid of 20×20 over each of the video frames and compute a color histogram, a histogram of gradients, or both, for each of the 400 regions in each frame.

At block 206, the processor or computing device calculate distances between matching regions of two consecutive frames. For example, the processor can calculate a Bhattacharyya distance between the matching regions of the two consecutive frames. As used herein, the Bhattacharyya distance refers to the measure of similarity between two probability distributions. In some examples, any other distance metric may be used. In various examples, the processor can calculate the distance for each of the features. As one example, given two types of features and a grid of 20×20, the distance calculation may yield two matrices of 20×20 scalars.

At block 208, the processor or computing device applies max pooling followed by min pooling in horizontal regions of the number of video frames. For example, the min and max pooling in the horizontal regions may use values calculated for one feature, such as the color histogram or the histogram of gradients. In various examples, the horizontal max pooling may have a stride that is equal to a size of the max pooling. For example, the horizontal min and max pooling may have a max pooling size of 2×10 with a stride of 2×10 followed by a min pooling of 10×2 that results in a single scalar. In this example, the max pooling may generate a scalar for each 2×10 region representing the maximum difference in each 2×10 region between two consecutive frames. The result may be 10×2=20 scalar values indicating maximum differences between corresponding 2×10 regions of the consecutive frames. The min pooling in this example would be a single scalar indicating the minimum of the resulting 10×2 scalars. The scalar may be used as a value for the horizontal change between the two consecutive video frames.

At block 210, the processor or computing device applies max pooling followed by min pooling in vertical regions of the number of video frames. In some examples, the vertical min and max pooling may use values calculated for a different feature than the horizontal min and max pooling, such as the histogram of gradients. In various examples, if the horizontal min and max pooling uses the histogram of gradients, then the vertical min and max pooling may use the color histogram values. The vertical max pooling may similarly have a stride that matches a size of the max pooling. For example, the vertical min and max pooling may have a max pooling size of 2×10 with a stride of 2×10 followed by a min pooling of 10×2 that results in a single scalar indicating a vertical change.

At decision diamond 212, the processor or computing device determines whether both a horizontal change and a vertical change between the two consecutive video frames exceed a threshold. For example, the threshold may be a predetermined fixed threshold. If both a vertical change and a horizontal change between the two consecutive video frames exceeds the threshold, then the method may proceed at block 214. If either a vertical change between the two consecutive video frames, a horizontal change between the two consecutive video frames, or both, do not exceed the threshold, then the method may proceed at block 202.

At block 214, the processor or computing device detects an application switch in response to detecting both a horizontal change and a vertical change in two consecutive video frames. As one example, the processor may detect an application switch in response to detecting that a horizontal change and a vertical change both exceed a threshold of 0.1. In some examples, the time of the switch may be marked.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the detected application switch may be included as metadata in a video file. In some examples, the detected application switch may be used to analyze the video file. In various examples, the detected application switch may be used to generate a summary of the video file. In some examples, the detected application switch may be used for a fast content search. In various examples, the detected application may be used to generate an automatic table of contents generation for the video that includes timestamps.

In some scenarios, the techniques described herein may be implemented in a cloud computing environment. As discussed in more detail below in reference to at least FIGS. 3-6, a computing device configured to detect application switches using min and max pooling may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
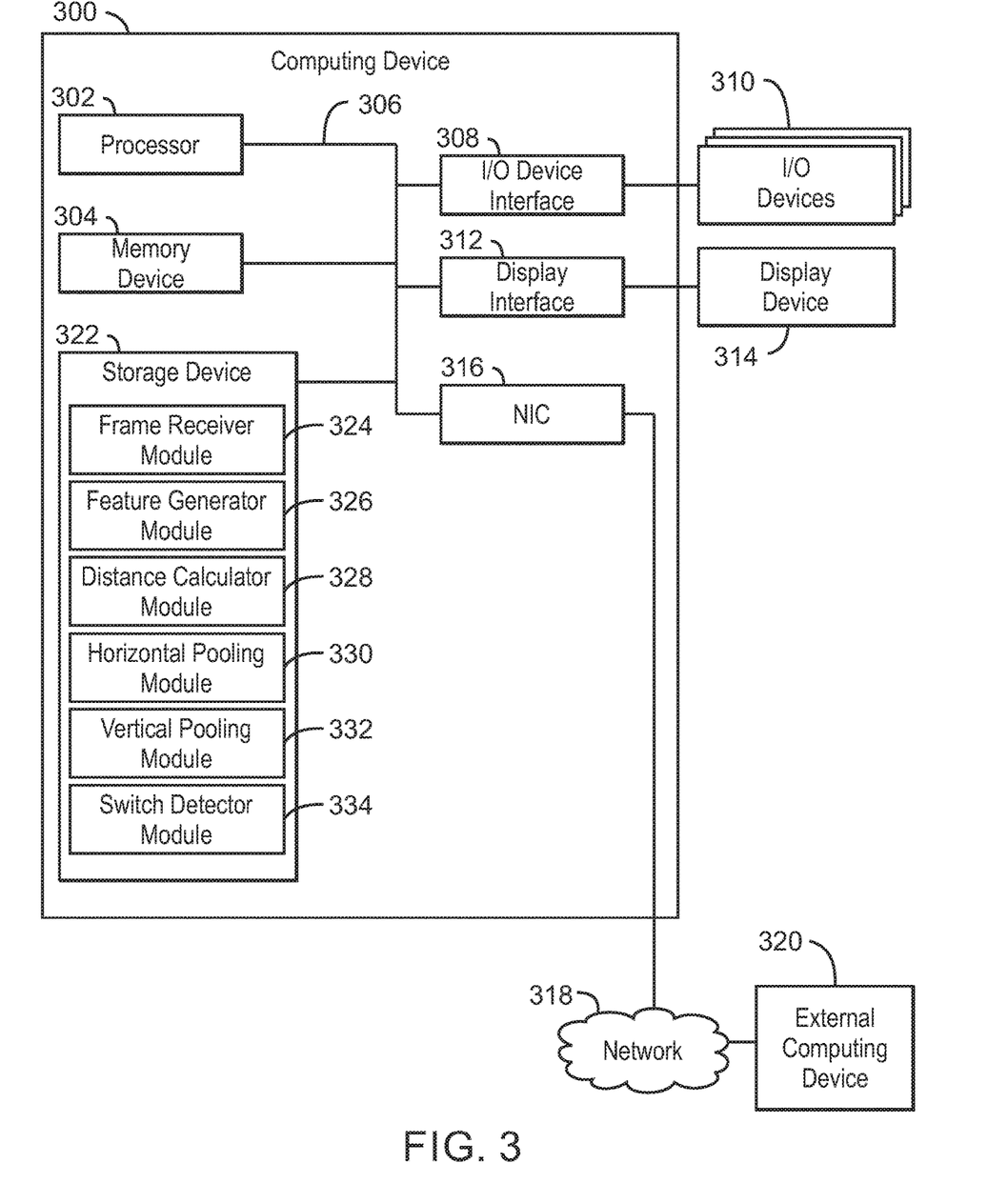
FIG. 3 is a block diagram of an example computing device that can detect switches between applications using min and max pooling.

FIG. 3 is block diagram of an example computing device that can detect switches between applications using min and max pooling. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a frame receiver module 324, a feature generator module 326, a distance calculator module 328, a max pooling module 330, a min pooling module 332, and a switch detector module 334. The frame receiver module 324 can receive a number of video frames. For example, the video frames may be from a streaming teleconference meeting. The feature generator module 326 can apply a grid to each video frame of the number of video frames and generate features for each cell in the grid. For example, the features may include a color histogram, a histogram of gradients, or both. The distance calculator module 328 can calculate distances between matching regions of two consecutive frames. For example, the distance calculator module 328 can calculate a Bhattacharyya distance between matching regions of two consecutive frames. In various examples, the distance calculator module 328 can calculate distances between matching regions of two consecutive frames for each of the features. The horizontal pooling module 330 can apply max pooling followed by min pooling in horizontal regions of the number of video frames. In various examples, the max pooling may use a stride equal to a size of the max pooling. The vertical pooling module 332 can apply max pooling followed by min pooling in vertical regions of the number of video frames. The switch detector module 334 can detect an application switch in response to detecting both a horizontal change and a vertical change between the two consecutive video frames exceed a threshold. For example, the threshold may be a predetermined fixed threshold. In various example, the switch detector module 334 can detect the application switch in real-time.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the frame receiver module 324, the feature generator module 326, the distance calculator module 328, the max pooling module 330, the min pooling module 332, and the switch detector module 334, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the frame receiver module 324, the feature generator module 326, the distance calculator module 328, the max pooling module 330, the min pooling module 332, and the switch detector module 334 can be implemented with logic, wherein the logic, as referred to herein, can include any suitable hardware (e.g., a processor, among others), software (e.g., an application, among others), firmware, or any suitable combination of hardware, software, and firmware.

Figure 4:
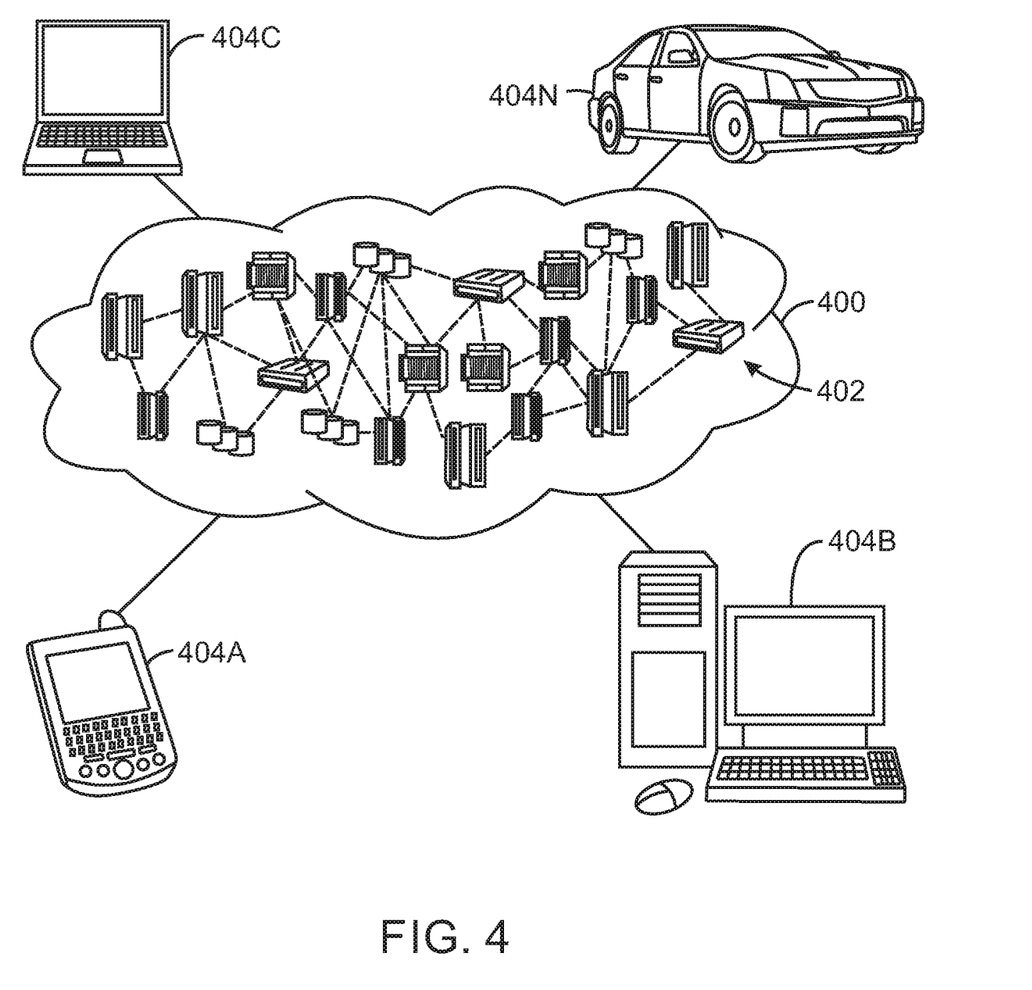
FIG. 4 is a diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
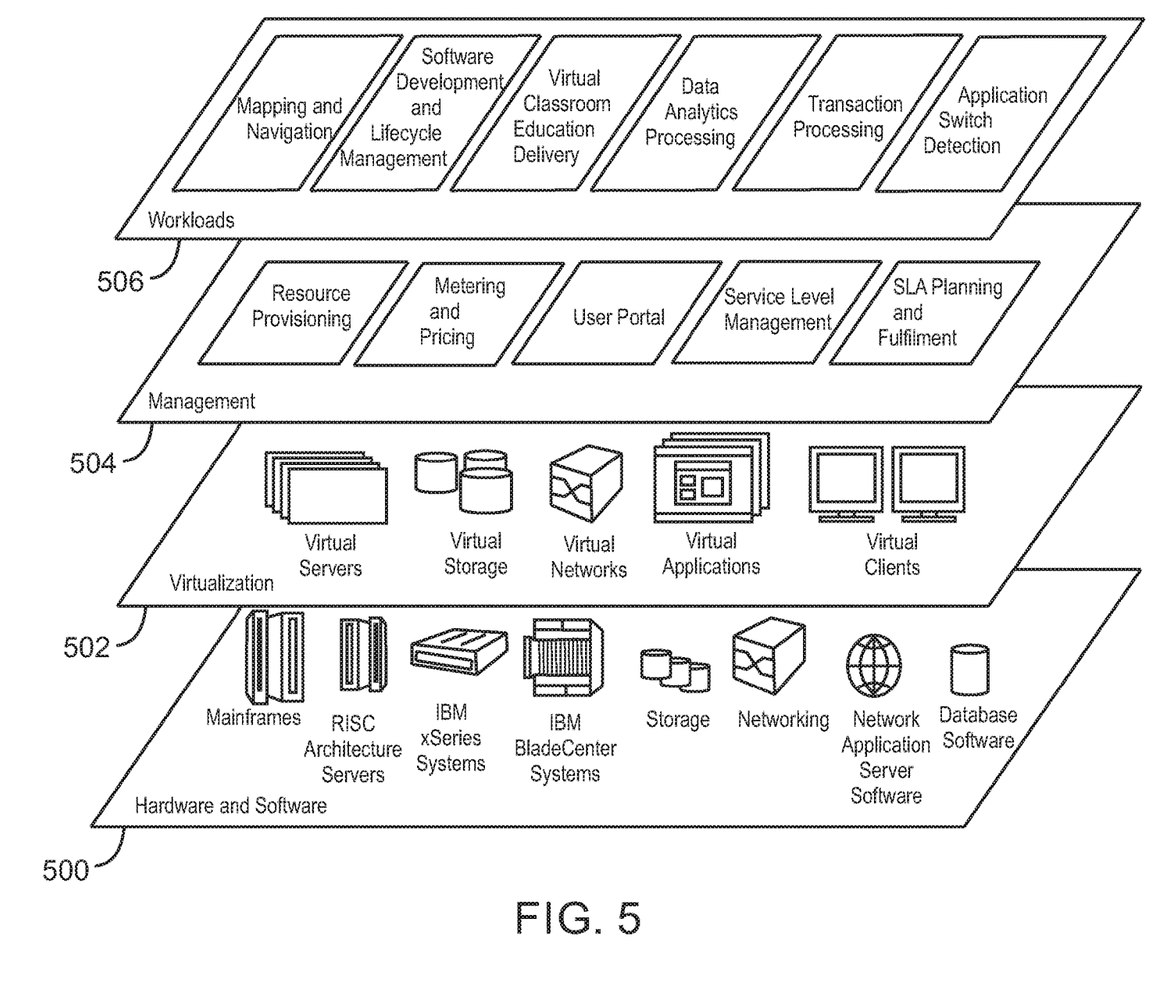
FIG. 5 is a diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and application switch detection.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
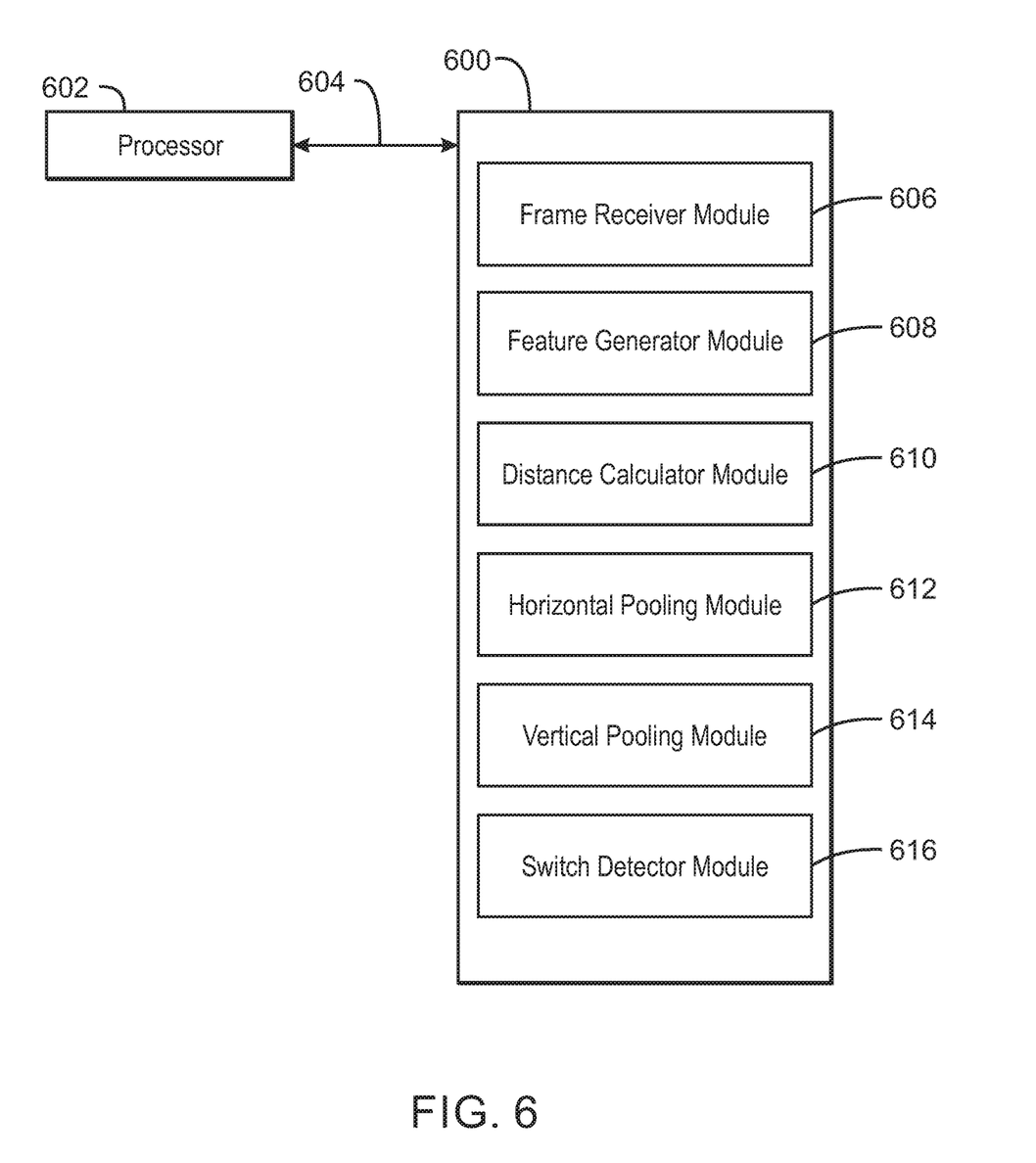
FIG. 6 is an example tangible, non-transitory computer-readable medium that can detect switches between applications using min and max pooling.

Referring now to FIG. 6, a block diagram is depicted of an example tangible, non-transitory computer-readable medium 600 that can detect switches between applications using min and max pooling. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 500 of FIG. 5 above.

The various software components discussed herein may be stored on the tangible, non-transitory, computer-readable medium 600, as indicated in FIG. 6. For example, a frame receiver module 606 includes code to receive a number of video frames. A feature generator module 608 includes code to apply a grid to each video frame of the number of video frames and generate features for each cell in the grid. The feature generator module 608 further includes code to generate a color histogram of the cells in the grid. The feature generator module 608 also includes code to generate a histogram of gradients for the cells in the grid. A distance calculator module 610 includes code to calculate distances between matching regions of two consecutive frames. For example, the distance calculator module 610 may include code to calculate a Bhattacharyya distance between the matching regions of the consecutive frames. The distance calculator module 610 may also include code to calculate the distance for each of the features. A horizontal pooling module 612 includes code to apply max pooling followed by min pooling in horizontal regions of the number of video frames. A vertical pooling module 614 includes code to apply max pooling followed by min pooling in vertical regions of the number of video frames. A switch detector module 616 includes code to detect an application switch in response to detecting both a horizontal change and a vertical change between the two consecutive video frames exceed a threshold. In some examples, the switch detector module 616 includes code to detect the application switch in real-time. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a plurality of video frames;
apply a grid to each video frame of the plurality of video frames and generate features for each cell in the grid;

calculate distances of the features between correspondingly located cells of two consecutive video frames of the plurality of video frames;

apply max pooling followed by min pooling of the calculated distances for a first feature of the generated features in horizontal regions of the two consecutive video frames of the plurality of video frames to calculate a horizontal change between the two consecutive video frames;

apply max pooling followed by min pooling of the calculated distances for a second feature of the generated features in vertical regions of the two consecutive video frames of the plurality of video frames to calculate a vertical change between the two consecutive video frames; and detect an application switch in response to detecting that both the horizontal change and the vertical change exceed a threshold.

2. The system of claim 1, wherein the features comprise a color histogram.

3. The system of claim 1, wherein the features comprise a histogram of gradients.

4. The system of claim 1, wherein the distances each comprise a Bhattacharyya distance.

5. The system of claim 1, wherein the distances of the features between the correspondingly located cells of the two consecutive video frames are calculated for each of the features.

6. The system of claim 1, wherein the max pooling comprises a stride equal to a size of the max pooling.

7. The system of claim 1, wherein the processor is to detect the application switch in real-time.

8. A computer-implemented method, comprising:
receiving, via a processor, a plurality of video frames;
applying, via the processor, a grid to each video frame of the plurality of video frames and generating features for each cell in the grid;
calculating, via the processor, distances of the features between correspondingly located cells of two consecutive video frames of the plurality of video frames;
applying, via the processor, max pooling followed by min pooling of the calculated distances for a first feature of the generated features in horizontal regions of the two consecutive video frames of the plurality of video frames to calculate a horizontal change between the two consecutive video frames;
applying, via the processor, max pooling followed by min pooling of the calculated distances for a second feature of the generated features in vertical regions the two consecutive video frames of the plurality of video frames to calculate a vertical change between the two consecutive video frames; and
detecting, via the processor, an application switch in response to detecting that both the horizontal change and the vertical change exceed a threshold.

9. The computer-implemented method of claim 8, wherein generating the features comprises generating a color histogram.

10. The computer-implemented method of claim 8, wherein generating the features comprises generating a histogram of gradients.

11. The computer-implemented method of claim 8, wherein calculating the distances comprises calculating a Bhattacharyya distance.

12. The computer-implemented method of claim 8, wherein calculating the distances comprises calculating the distance for each of the features.

13. The computer-implemented method of claim 8, wherein applying the max pooling comprises using a stride with a size equal to a size of the max pooling.

14. The computer-implemented method of claim 8, wherein detecting the application switch is executed by the processor in real-time.

15. A computer program product for detecting application switches, the computer program product comprising a computer-readable storage medium having program code embodied therewith, wherein the computer readable storage medium is not a transitory signal per se, the program code executable by a processor to cause the processor to:
receive a plurality of video frames;
apply a grid to each video frame of the plurality of video frames and generate features for each cell in the grid;
calculate distances of the features between correspondingly located cells of two consecutive frames;
apply max pooling followed by min pooling of the calculated distances for a first feature of the generated features in horizontal regions of the two consecutive video frames of the plurality of video frames to calculate a horizontal change between the two consecutive video frames;
apply max pooling followed by min pooling of the calculated distances for a second feature of the generated features in vertical regions of the two consecutive video frames of the plurality of video frames to calculate a vertical change between the two consecutive video frames; and
detect an application switch in response to detecting both the horizontal change and the vertical change exceed a threshold.

16. The computer program product of claim 15, further comprising program code executable by the processor to generate a color histogram of the cells in the grid.

17. The computer program product of claim 15, further comprising program code executable by the processor to generate a histogram of gradients for the cells in the grid.

18. The computer program product of claim 15, further comprising program code executable by the processor to calculate Bhattacharyya distances of the features between the correspondingly located cells of the two consecutive video frames.

19. The computer program product of claim 15, further comprising program code executable by the processor to calculate the distance for each of the features.

20. The computer program product of claim 15, further comprising program code executable by the processor to detect the application switch in real-time.

* * * * *